(12) United States Patent
Eschbach et al.

(10) Patent No.: US 6,715,127 B1
(45) Date of Patent: Mar. 30, 2004

(54) SYSTEM AND METHOD FOR PROVIDING EDITING CONTROLS BASED ON FEATURES OF A RASTER IMAGE

(75) Inventors: Reiner Eschbach, Webster, NY (US); William A. Fuss, Rochester, NY (US); Daniel M. Murray, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/215,175

(22) Filed: Dec. 18, 1998

(51) Int. Cl.[7] .............................................. G06F 17/21
(52) U.S. Cl. ...................................................... 715/502
(58) Field of Search ................................ 345/825, 708, 345/467, 468, 469; 358/537; 707/530, 502, 515, 516; 715/502, 513, 516

(56) References Cited

U.S. PATENT DOCUMENTS

| | | | | |
|---|---|---|---|---|
| 4,815,029 A | | 3/1989 | Barker et al. ................ 707/516 |
| 5,452,094 A | * | 9/1995 | Ebner et al. | |
| 5,495,349 A | * | 2/1996 | Ikeda ........................... 358/523 |
| 5,495,565 A | * | 2/1996 | Millard et al. ............... 707/506 |
| 5,572,648 A | * | 11/1996 | Bibayan ....................... 395/340 |
| 5,576,847 A | * | 11/1996 | Sekine et al. ................ 358/448 |
| 5,583,665 A | * | 12/1996 | Gregory, Jr. et al. ........ 358/504 |
| 5,644,738 A | * | 7/1997 | Goldman et al. ............ 395/352 |
| 5,666,503 A | * | 9/1997 | Campanelli et al. ......... 345/356 |
| 5,687,303 A | | 11/1997 | Motamed et al. ........... 358/1.18 |
| 5,729,715 A | * | 3/1998 | Ina et al. ...................... 711/162 |
| 5,790,708 A | * | 8/1998 | Delean ......................... 382/270 |
| 5,852,435 A | * | 12/1998 | Vigneaux et al. ............ 345/302 |
| 5,854,857 A | * | 12/1998 | de Queiroz et al. ......... 382/232 |
| 5,883,623 A | * | 3/1999 | Cseri ............................ 345/335 |
| 5,907,319 A | * | 5/1999 | Hashimoto et al. ......... 345/173 |
| 5,982,387 A | * | 11/1999 | Hellmann .................... 345/469 |
| 6,061,696 A | * | 5/2000 | Lee et al. ..................... 707/513 |
| 6,097,853 A | * | 8/2000 | Gu et al. ...................... 382/282 |
| 6,115,133 A | * | 9/2000 | Watanabe .................... 358/1.15 |
| 6,134,338 A | * | 10/2000 | Solberg et al. .............. 707/502 |
| 6,169,547 B1 | * | 1/2001 | Tanaka et al. ............... 345/348 |
| 6,181,836 B1 | * | 1/2001 | Delean ......................... 382/302 |
| 6,195,101 B1 | * | 2/2001 | Ghislain Bossut et al. . 345/433 |
| 6,249,908 B1 | * | 6/2001 | Stamm ............................ 717/5 |
| 6,256,104 B1 | * | 7/2001 | Rumph et al. ............... 358/1.15 |
| 6,256,650 B1 | * | 7/2001 | Cedar et al. ................. 707/517 |
| 6,317,141 B1 | * | 11/2001 | Pavley et al. ................ 345/723 |
| 6,552,727 B2 | * | 4/2003 | Stamm .......................... 345/467 |
| 6,571,051 B2 | * | 5/2003 | Savoie .......................... 386/55 |

FOREIGN PATENT DOCUMENTS

EP          690415 A2 *   6/1995      ........... G06T/11/60

* cited by examiner

Primary Examiner—Stephen S. Hong
(74) Attorney, Agent, or Firm—Oliff & Berridge, PLC

(57) ABSTRACT

An image editing system and method provides a user with edit commands based on edit-related features for a raster image to be edited. The edit-related feature used to determine which edit commands are provided to the user can include DIR-type rendering hints, a compression ratio for the image or portion of the image, a compression scheme used to compress the image or portion of the image and other raster image features. The edit commands presented to a user can be user customized. Thus, an intelligent set of edit commands can be provided that is related to the raster image being edited.

17 Claims, 3 Drawing Sheets

SYSTEM AND METHOD FOR PROVIDING EDITING CONTROLS BASED ON FEATURES OF A RASTER IMAGE

BACKGROUND OF THE INVENTION

1. Field of Invention

This invention relates to providing a user of a raster image editor with editing controls based on features of a raster image to be edited.

2. Description of Related Art

Image editors, such as Adobe Photoshop, Corel PhotoPaint, etc., are raster editors that allow a user to modify raster images. These editors offer the user a large, and often confusing, selection of image editing and other manipulation tools and/or commands to modify a raster image.

U.S. Pat. No. 4,815,029 to Barker et al. proposes an in-line dynamic editor for documents containing mixed object types. The mixed object types can be text objects, draw graphics objects, business graphics objects, and tables objects. The editor executes actions, such as displaying editing actions, based on the object type of an object selected by the user for editing.

SUMMARY OF THE INVENTION

However, the Barker editor does not disclose that the editing commands displayed can be determined based on features of a raster image, or portion of a raster image, that is selected. Instead, the Barker editor only performs actions based on an object type of a selected object.

The invention provides a system and method for providing editing commands to a user of a raster image editor based on features of a raster image, or portion of a raster image, to be edited. For example, a specific set of editing commands or tools can be displayed to a user based on a specific feature in a raster image.

In one aspect of the invention, an image feature used to determine editing commands provided to the user is a DIR rendering hint associated with the raster image.

In one aspect of the invention, the image feature used to determine the editing commands provided to the user is a type of image coding or compression scheme used to process the raster image data.

In one aspect of the invention, the image to be edited is a DIR-type image having two or more planes. Editing commands provided to the user are determined based on a dominant plane in the image.

In one aspect of the invention, a dominant plane of DIR-type image is determined based on a compression ratio of the planes.

In one aspect of the invention, a dominant plane in a DIR-type image is determined as the least compressed plane.

In one aspect of the invention, editing commands provided to the user are determined based on a compression ratio for the raster image.

In one aspect of the invention, editing commands provided to a user are user-configurable, such that custom editing commands can be provided based on a feature of a raster image to be edited.

BRIEF DESCRIPTION OF THE DRAWINGS

The invention will be described in relation to the following drawings, in which reference numerals refer to like elements, and wherein.

DETAILED DESCRIPTION OF PREFERRED EMBODIMENTS

The invention is described below in connection with a specific example involving a DIR-type raster image. Thus, a brief description of a DIR-type raster image is initially provided. Although the invention is described in connection with a specific example, the invention can be used with any type of raster image, not just DIR-type raster images. Thus, the invention can be used with JPEG, TIFF, GIF, or other raster images as desired. As used herein, the term "raster image" refers to any bitmap-type image, but is not limited to a binary-type bitmap image. Likewise, the term "edit" refers to any operation that alters a raster image in any way, including operations directed to single pixels, groups of pixels or an entire image.

Figure 1:
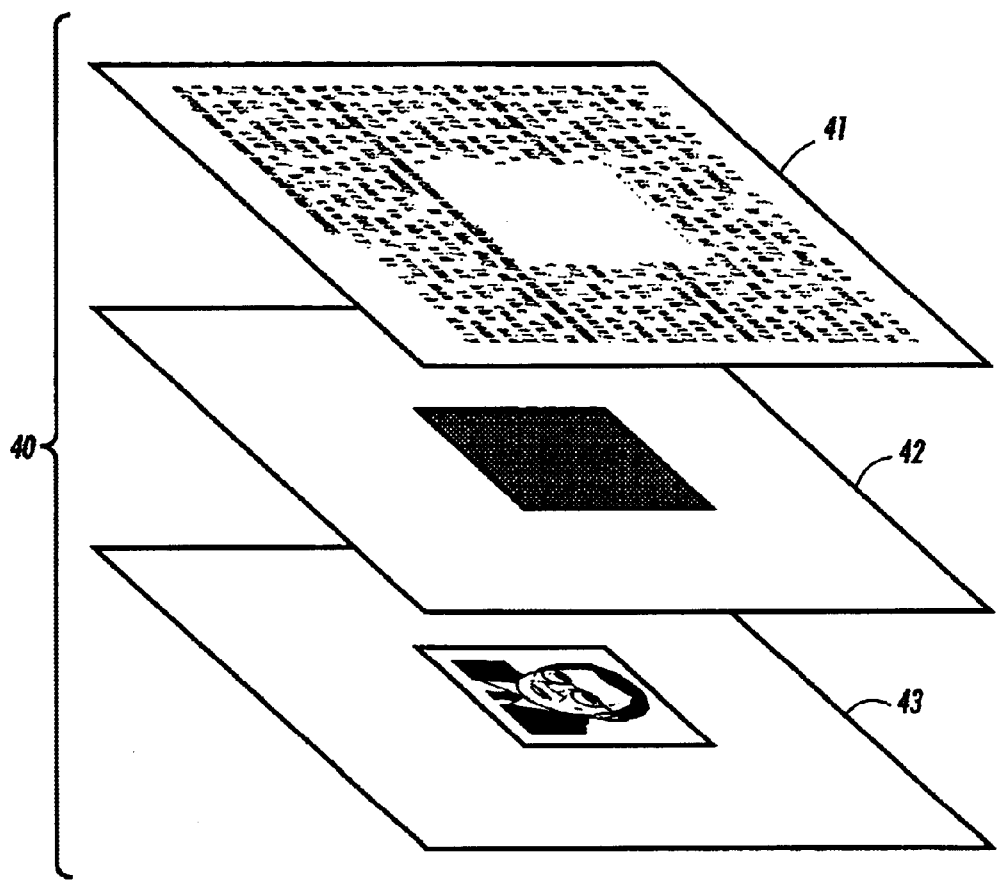
FIG. 1 is a schematic diagram of an example DIR-type image.

The Document Image Representation (DIR) scheme for describing scanned or rasterized page description language (PDL) documents has been proposed to facilitate the sharing of raster-oriented documents among users with different pieces of office equipment (such as personal computers, digital copiers, and printers). Thus, higher speed, higher image quality, and modest computing resources, e.g., memory, storage, processing power and/or bandwidth are made possible by the DIR scheme. To allow the efficient exchange of image data, the DIR format enables very high compression ratios (e.g., >>10). An effective approach for achieving high compression ratios is to compress different segments of raster image data according to the data's individual attributes. For example, text and line-art data are compressed using a method that puts a high emphasis on maintaining detail and structure of the input image data. Pictures and color sweeps are compressed using a method that places a high emphasis on maintaining the smoothness and accuracy of colors. Thus, a DIR-type image, at least conceptually, is segmented into at least three different planes, as shown in FIG. 1. In this example, the image 40 comprises a text and/or line art layer 41, a selector layer 42, and a picture layer 43. As can be seen in FIG. 1, the text/line-art layer 41 and the picture layer 43 include text/line-art data and picture/color sweep data, respectively. The selector layer 42 is a binary plane that switches between the text/line art layer 41 and the picture layer 43. Thus, the raster image 40 is constructed by combining the text/line-art layer 41 and the picture layer 43 based on information in the selector layer 42. In this example, black portions in the selector layer 42 represent that the picture layer 43 contributes data to the raster image 40, whereas white portions of the selector layer 42 indicates that the text/line-art layer 41 contributes to the raster image 40.

A DIR-type raster image 40 also preferably includes a fourth layer (not shown in FIG. 1) that contains a rendering hint, or tag, that indicates an attribute of the raster image 40 or a portion of the raster image 40. The rendering hint indicates a design intent or other attribute of the raster image 40 and can be used by an output device, such as a printer, when rendering the image 40. For example, a rendering hint can suggest that the image 40, or a portion of the image 40, should be rendered to place a priority on maintaining image detail, gradation, color accuracy, color distinction, color matching, etc. These rendering hints are not intended to define a specific processing when rendering the image 40, but instead are intended to suggest a design intent or other attribute of the image 40 that can be interpreted and used during rendering to achieve a desired result. For example, a rendering hint that suggests placing a priority on detail could be interpreted by an output device as meaning an additional MTF compensation process should be incorporated when rendering the image 40, or the rendering hint could be interpreted as suggesting that a high frequency halftoning screen should be used.

Rendering hints can be generated for an image 40 either by a human operator associating a specific rendering hint with the image 40 or a portion of the image 40, or can be automatically generated. If the rendering hints are automatically generated, the rendering hints can be determined based on a type of processing used for the image, such as a type of compression, or can be determined based on an analysis of a type of image depicted, such as a contone image, text or line art, the types and/or positions of colors in the image, etc.

Since the raster image 40 in a DIR-type format is segmented into three layers, each of the three layers can be compressed in different ways and/or using different compression ratios, thus enabling a high overall compression ratio for the image 40. For example, while the text/line-art layer 41 cannot always be compressed in a lossy fashion, the picture layer 43 can usually be compressed in a lossy fashion at a relatively high compression ratio without a noticeable change in image appearance.

Separation of the image data by content also implies that different resolutions can be used for the different data, e.g., a high spatial resolution for text/line-art data and a high "color resolution" for picture/color sweep data.

Figure 2:
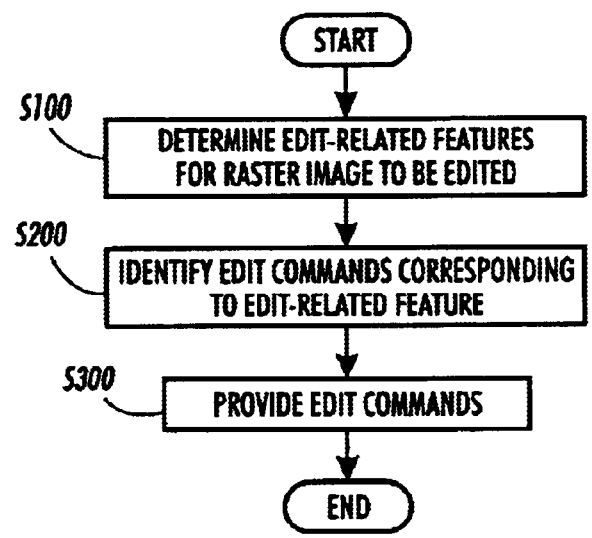
FIG. 2 is a flowchart of steps of a method for providing editing commands based on features of a raster image to be edited.

FIG. 2 is a flowchart of steps of a method for providing editing commands to a user for editing a raster image. The method is described below in connection with editing a DIR-type raster image. However, the method is not limited to editing DIR-type raster images. Instead, the method can be used with any type of raster image.

In step S100, an image editor, such as an image editing application similar to Adobe Photoshop, determines an edit-related feature for a raster image to be edited. The edit-related feature can be a DIR rendering hint associated with the raster image, or a portion of the raster image, when a DIR-type raster image is to be edited. The edit-related feature can also be a type of image coding or compression scheme used to process the image or portion of the image, such as JPEG, ZIP, etc. If a DIR-type image is being edited that is segmented into three or more layers, the edit-related feature can be determined based on a compression method for the layer to be edited, or based on a compression method for a dominant layer where layers overlap. For example, if the layers of a DIR-type image overlap, the dominant layer can be determined by identifying the layer that was least compressed. Then, the edit-related feature is determined for the least compressed layer. The edit-related feature can also include other image features, including image color content, the type of image represented by the image data, the types and relative positions of colors in the image, etc.

The image editor can determine the edit-related feature upon receiving a request from a user to open a raster image for editing, or in response to a user selecting an image, or portion of an image, to be edited. Selection of the image can be performed by placing a mouse cursor or other user pointing device near or "over" an image or portion of an image, selecting an icon or other representation of the image to be edited, performing an editing or other function with respect to the image, etc.

In step S200, edit commands or functions corresponding to the determined edit-related feature are identified. In this example, the image editor can access a set of edit commands or functions that are stored and correspond to a determined DIR rendering hint, a compression or coding scheme, or other feature of the raster image to be edited. The set of edit commands can be include one or more edit commands as desired. For example, if a "contour" rendering hint is determined in step S100, edit commands related to processing of contours and shapes, such as morphological filters, resolution conversion functions, etc. can be retrieved.

In step S300, the edit commands identified in step S200 are provided to the user. In this example, the image editor could display the edit commands, or representations of the edit commands, on a displayed edit screen along with the raster image. For example, edit function icons could be displayed and/or a command bar or pull down menu of commands retrieved in step S200 can be displayed to the user.

Figure 3:
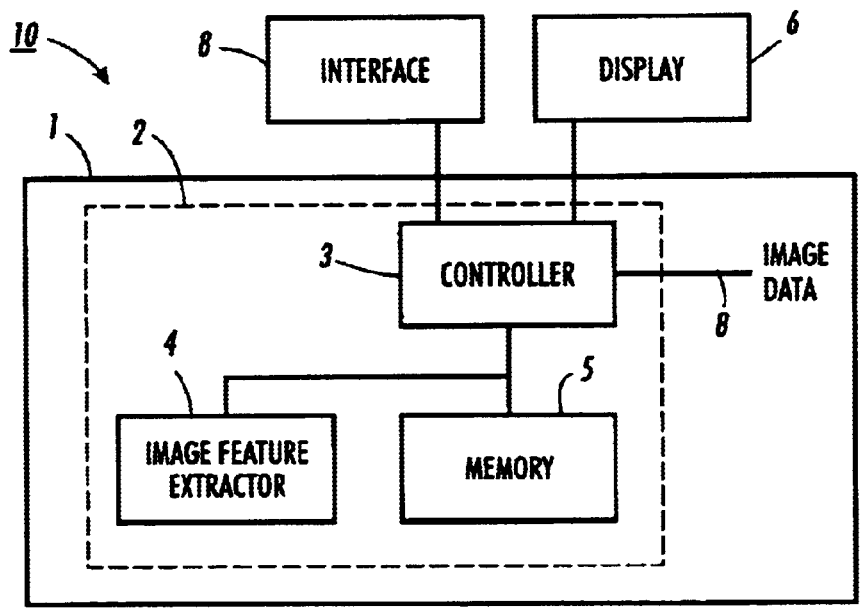
FIG. 3 is a schematic block diagram of an image editing system in accordance with the invention.

FIG. 3 is a schematic block diagram of an image editing system 10 in accordance with the invention. The image editing system 10 includes a data processing system 1 that can be a general purpose computer, or a network of general purpose computers, and other associated devices, including communications devices, modems, data storage devices, and/or other circuitry or components necessary to perform the desired input/output or other functions.

Although the image editing system 10 is described as a computer system, the image editing system 10 can include devices such as copiers, printers, facsimile machines, scanners, etc. Likewise, the image editing system 10 could be a stand alone copier, printer or other image output device that provides a user with raster image editing or other manipulation capabilities.

The data processing system 1 includes an edit command controller 2, which is shown schematically in FIG. 3. That is, the edit command controller 2 is not necessarily a discrete data processing module or other device in the data processing system 1. Instead, the edit command controller 2 can be a collection of separate modules and/or devices in the data processing system 1 that together function as an edit command controller.

In this example, the edit command controller 2 includes a controller 3 that can be implemented, at least in part, as a general purpose data processor and/or a single special purpose integrated circuit, e.g., ASIC (or an array of ASICs) each having a main or central processor section for overall, system level control, and separate sections dedicated to performing various specific computations, functions and other processes under the control of the central processor section. The controller 3 can also be implemented using a plurality of separate dedicated programmable integrated or other electronic circuits or devices, e.g., hard wired electronic or logic circuits, such as discrete element circuits or programmable logic devices. The controller 3 also preferably includes other devices, such as volatile or non-volatile memory devices, communication devices, and/or other circuitry or components necessary to perform the desired functions.

The data processing system 1 also includes a memory 5, which can be one or more volatile and/or non-volatile memory devices, such as optical disk, magnetic media, semiconductor or other memory devices. The memory 5 stores at least edit command information and corresponding raster image feature information.

The data processing system 1 also includes an image feature extractor 4 that determines edit-related features of a raster image to be edited for purposes of providing edit commands. The image feature extractor 4 can be implemented as a software module that is executed by the controller 3 or any other suitable data processing apparatus. Alternately, the image feature extractor 4 can be implemented as hard-wired electronic circuits or other programmed integrated or other electronic circuits or devices, e.g., hardwired electronic or logic circuits such as discrete element circuits or programmable logic devices.

The data processing system 1 communicates with a display 6 that preferably provides a representation of a raster image to be edited and/or edit commands or other information to a user. However, a representation of the raster image could be printed on a substrate or otherwise provided. Thus, the display can be a computer monitor, printer or any other device capable of generating a representation of a raster image and/or providing other information to a user.

The data processing system 1 also communicates with an interface 7 that allows a user, or other entities, to interact with the data processing system 1 and can include one or more of a keyboard, mouse or other user pointing device, touch screen and associated display, image edit function buttons or keys, a voice recognition system, a scanner, modem, data input/output device or any other device that allows information to be input into and/or received from the data processing system 1. Thus, the interface 7 can include a communications network, a computer network (e.g., a LAN or WAN), the Internet, or other network or group of networks.

Therefore, the interface 7 can provide and/or receive information to and from the data processing system 1. For example, raster image data could be provided to the data processing system 1 by the interface 7. Alternately, raster image data can be provided by the memory 5 or on a communication line 8 within the data processing system 1. The raster image data can be provided in either compressed or uncompressed form. If the raster image data is compressed, the controller 3, or other dedicated module or circuitry decompresses the raster image data as necessary and provides control information to the display 6 to display the image or portions of the image, as appropriate. Image data compression and decompression schemes as well as image display techniques and systems are well known and are not described in detail here. Likewise, only portions of the data processing system 1 that are particularly relevant to the invention are described and shown in FIG. 3. Of course, the data processing system 1 can, and preferably will, include additional components, modules, circuitry or other devices as desired.

Figure 4:
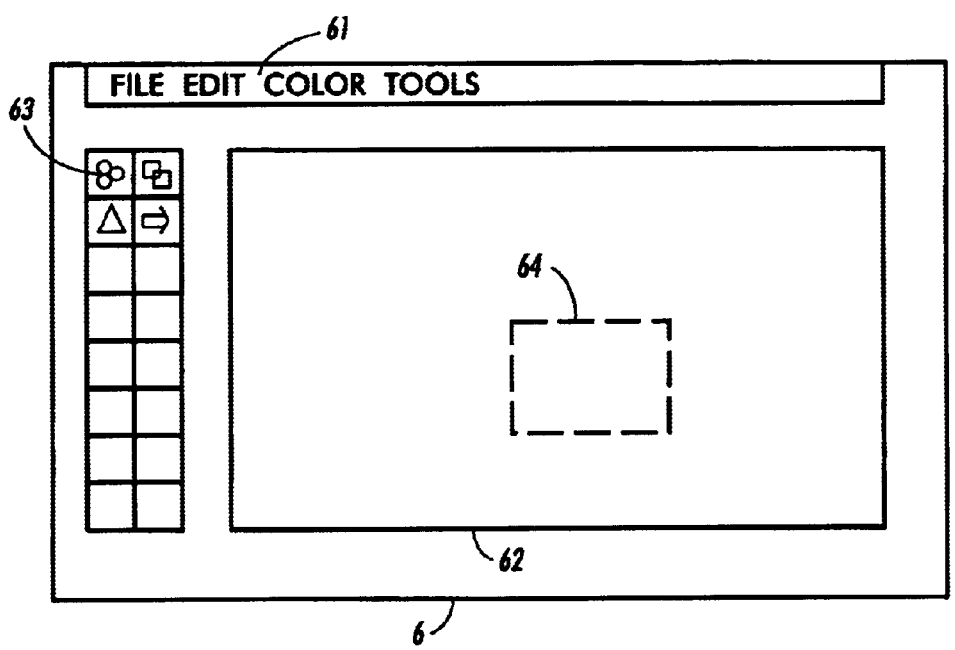
FIG. 4 is an example graphical user interface for use with the invention.

When the image editing system 10 is used to edit or otherwise manipulate a raster image, a user designates a raster image for editing and the image editing system 10 preferably displays the selected image, or a portion of the image, as part of a graphical user interface, such as that shown in FIG. 4. The graphical user interface includes a command bar 61, which includes a listing of pull down menu headings that can be selected to provide a list of commands that can be invoked by the user. The image or portion of the image is displayed in a work space 62. The edit command controller 2 can display a set of editing commands that are relevant to the displayed image in the command bar 61 and/or display commands as function buttons 63 separate from the command bar 61. Although the function buttons 63 shown in FIG. 4 are displayed on a left side of the work space 62, the function buttons 63 could be displayed anywhere on the display 6 or otherwise provided for the user by the interface 7, e.g. associated with a keyboard or other control button, or button combination, voice command, etc.

The graphical user interface on the display 6 can also include a cursor 64 that allows a user to select portions of a displayed image, edit function buttons 63 or other items displayed as part of the graphical user interface. In FIG. 4, the cursor 64 is shown as a rectangular area selection cursor. However, the cursor 64 can take other shapes, including a cross-hair cursor, a common "arrow" cursor, etc. Further, the cursor 64 could be .controlled by the user to change in size and/or shape so that different portions of an image can be selected. If any area of a displayed image is selected, the edit command controller 2 can display edit commands that are relevant to the selected image area. The edit commands can be displayed in the command bar 61, as function buttons 63 or provided in other manners.

Whether in response to initially displaying an image, or in response to a user selecting an image or a portion of an image, the edit command controller 2 provides edit commands relevant to the image based on the image feature extractor 4 determining an edit-related feature for the displayed and/or selected image or image portion. If the raster image to be edited is a DIR-type image, the image feature extractor 4 can identify the rendering hint associated with the image overall or the rendering hint associated with a particular portion, e.g., layer, of the DIR-type image that is selected. For example, if the rendering hint associated with a displayed image is "contour", the image feature extractor 4 informs the controller 3 of the rendering hint, and the controller 3 retrieves edit commands that are associated with the "contour" rendering hint from the memory 5. The retrieved editing commands are then provided to the user, e.g., displayed in the command bar 61, displayed as function buttons 63, associated with user-initiated cursor 64 action, such as double clicking or selecting, associated with keyboard strokes or other control button operation, etc.

The image feature extractor 4 can also determine other edit-related features in an image or image portion apart from DIR rendering hints. For example, the image feature extractor 4 could determine the type of image coding or compression scheme used to compress an image or portion of an image and identify the coding or compression scheme used to the controller 3. In response, the controller 3 can retrieve and instruct the display 6 or interface 7 to provide editing commands that are related to the determined coding or compression scheme. For example, if a selected image portion was compressed using JPEG compression, a set of editing commands that are related to JPEG compressed images can be provided to the user. Other edit-related features can be identified by the image feature extractor 4, including types and/or relative positions of colors in an image, the content of the image, an analysis of the image data such as a number of edges detected or spatial frequency features, etc. In a DIR-type image context, the image feature extractor 4 can also determine edit-related features for images that are segmented into two or more layers. For example, if a first layer of an image is to be edited, editing commands relevant to a feature for the first layer can be provided. Likewise, if the second layer in the image is to be edited or is selected, the image feature extractor 4 can determine an edit-related feature for the second layer. In cases where the first and second layers overlap or are composited, the image feature extractor 4 can determine a dominant layer and determine an edit-related feature for the dominant layer. For example, a dominant layer could be determined by identifying the layer that was least compressed or has a lowest compression ratio. Then, the controller 3 can provide the user with editing commands that are particularly relevant to the dominant layer identified by the image feature extractor 4.

Although the image editing system 10 has been described above as automatically providing editing commands to a user based on an automated analysis of a raster image, the editing commands provided to a user can be configured by the user. For example, a user could instruct the edit command controller 2 to provide a particular set of editing commands whenever a specific rendering hint, compression scheme, compression ratio, or other edit-related feature of a raster image is identified in a displayed and/or selected image or image portion. Thus, a user can determine that a set of edit commands provided for a particular rendering hint is too broad and that one or more edit commands should not be displayed. Using the interface 7, the user could instruct the controller 3 to alter the association between the edit commands stored in the memory 5 and the particular rendering hint or other edit-related feature. Thus, the user could not only delete, but add edit commands that are provided when a particular edit-related feature is identified by the image feature extractor 4 in a displayed and/or selected raster image to be edited.

While the invention has been described in conjunction with specific embodiments, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for providing edit commands based on features in a rasterized image to be edited, comprising:
    selecting at least a portion of the rasterized image to be edited;
    determining at least one feature for the at least a portion of a rasterized image to be edited;
    determining, from the at least one feature, a pre-rasterization representation for the selected portion of the rasterized image to be edited, said pre-rasterization representation including at least a rendering hint;
    identifying an edit command for editing the selected portion of the rasterized image to be edited that corresponds to the determined feature from the pre-rasterization representation; and
    providing the edit command for editing the selected portion of the rasterized image to be edited to a user of an image editing system.

2. The method of claim 1, wherein determining the at least one of feature comprises:
    determining at least one feature for at least a portion of a rasterized image that has been selected by the user.

3. The method of claim 1, wherein determining at least one feature comprises:
    identifying a plane of at least a portion of the rasterized image to be edited.

4. The method of claim 1, wherein the at least one feature identifies at least one of type of image, type of color and type and relative position of color, in at least the portion of the rasterized image to be edited.

5. A method for providing edit commands based on features in a rasterized image to be edited, comprising:
    identifying a dominant plane in at least portion of the rasterized image to be edited;
    identifying at least one feature associated with the dominant plane;
    determining from the at least one feature a pre-rasterization representation for the selected portion of the rasterized image to be edited, said pre-rasterization representation including at least a rendering hint;
    identifying, from the pre-rasterization representation, an edit command for editing the selected portion of the rasterized image to be edited that corresponds to the determined at least one feature; and
    providing the edit command for editing the selected portion of the rasterized image to be edited to a user of an image editing system.

6. The method of claim 5, wherein identifying a dominant plane in at least a portion of the rasterized image to be edited, comprises:
    determining a compression ratio for planes in at least a portion of the rasterized image to be edited.

7. The method of claim 1, wherein determining at least one feature further comprises:
    determining a compression ratio for at least a portion of the rasterized image to be edited.

8. The method of claim 5, wherein determining at least one feature comprises:
    determining at least one feature for at least a portion of a rasterized image to be edited, and determining, from the at least one feature, at least a rendering hint associated with at least a portion of a rasterized image to be edited.

9. A method for providing edit commands based on features in a rasterized image to be edited, comprising:
    selecting at least a portion of the rasterized image to be edited;
    determining a pre-rasterization representation for the selected portion of the rasterized image to be edited, said pre-rasterization representation including at least a rendering hint;
    determining at least a rendering hint associated with the selected portion of the rasterized image to be edited;
    identifying, from the rendering hint, an edit command for editing the selected portion of the rasterized image to be edited that corresponds to the determined at least one feature; and
    providing the edit command for editing the selected portion of the rasterized image to be edited to a user of an image editing system,
    wherein identifying from the rendering hint, an edit command for editing the selected portion of the rasterized image to be edited corresponding to the at least one determined feature comprises identifying a user-customized set of edit commands for editing the selected portion of the rasterized image to be edited corresponding to the at least one determined feature.

10. The method of claim 9, wherein determining at least one feature comprises:
    determining at least one feature for at least a portion of a rasterized image to be edited, and determining, from the at least one feature, at least a rendering hint associated with at least a portion of a rasterized image to be edited.

11. An image editing system comprising:
- a feature determining means for determining at least one feature for the at least a portion of a rasterized image to be edited and determining, from the at least one feature, a pre-rasterization representation for the selected portion of the rasterized image to be edited, said pre-rasterization representation including at least a rendering hint:
- a command identifying means for identifying at least one edit command for editing the selected portion of the rasterized image to be edited that corresponds to the determined at least one feature; and
- a means for providing identified edit commands for editing the selected portion of the rasterized image to be edited to a user of the image editing system.

12. The image editing system of claim 11, wherein the feature determining means further comprises means for determining at least a rendering hint which is associated with at least a portion of the rasterized image to be edited.

13. An image editing system comprising:
- a memory that stores edit commands for editing at least a portion of the rasterized image to be edited;
- an image feature extractor that identifies at least one feature for the selected portion of a rasterized image to be edited and determines, from the at least one feature, a pre-rasterization representation for the selected portion of the rasterized image to be edited, said pre-rasterization representation including at least a rendering hint;
- an interface that receives user input indicating an edit command for editing the selected portion of the rasterized image to be edited provided to the user;
- a display that displays at least the portion of the rasterized image to be edited; and
- a controller that determines when at least the portion of the rasterized image has been selected and identifies stored edit commands for editing the selected portion of the rasterized image to be edited that correspond to the at least one feature determined by the image feature extractor.

14. An image editing system comprising:
- a memory that stores edit commands for editing the selected portion of the rasterized image to be edited;
- an image feature extractor that identifies at least one feature of at least a portion of a rasterized image to be edited, and determines, from the at least one feature, a pre-rasterization representation for the selected portion of the rasterized image to be edited, said pre-rasterization representation including at least a rendering hint;
- an interface that receives user input indicating an edit command for editing the selected portion of the rasterized image to be edited provided to the user;
- a display that displays at least the portion of the rasterized image to be edited; and
- a controller that determines when at least the portion of the rasterized image has been selected and identifies stored edit commands for editing the selected portion of the rasterized image to be edited that correspond to the at least one feature identified by the image feature extractor,
- wherein the image feature extractor identifies at least one feature associated with a dominant plane in at least the portion of the rasterized image to be edited.

15. The image editing system of claim 14, wherein the image feature extractor identifies the dominant plane by comparing compression ratios for planes in at least the portion of the rasterized image to be edited.

16. The image editing system of claim 13, wherein the controller receives information from the user to custom configure a set of edit commands for editing the selected portion of the rasterized image to be edited that are associated with at least one feature.

17. A method for providing edit commands based on features in a rasterized image, comprising:
- determining a pre-rasterization representation for the selected portion of the rasterized image to be edited, said pre-rasterization representation including at least a rendering hint;
- determining at least one rendering hint that is associated with at least a portion of the rasterized image to be edited;
- identifying an edit command for editing the selected portion of the rasterized image to be edited that corresponds to the determined at least one rendering hint;
- providing the edit command for editing the selected portion of the rasterized image to be edited to a user of an image editing system; and
- providing the rendering hint to an output device wherein the rendering hint associated with at least the portion of the rasterized image prioritizes at least one of image detail, gradation, color accuracy, color distinction and color matching during at least one of editing and processing.

\* \* \* \* \*